US012710034B2

(12) United States Patent
Lim et al.

(10) Patent No.: US 12,710,034 B2
(45) Date of Patent: Aug. 18, 2026

(54) COMPRESSOR

(71) Applicant: SAMSUNG ELECTRONICS CO., LTD., Suwon-si (KR)

(72) Inventors: Dongseok Lim, Suwon-si (KR); Jongjun Seo, Suwon-si (KR); Mincheol Yun, Suwon-si (KR); Namsu Kim, Suwon-si (KR); Yongyeon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/797,020

(22) Filed: Aug. 7, 2024

(65) Prior Publication Data

US 2024/0392766 A1 Nov. 28, 2024

Related U.S. Application Data

(63) Continuation of application No. PCT/KR2023/003061, filed on Mar. 7, 2023.

(30) Foreign Application Priority Data

May 2, 2022 (KR) ........................ 10-2022-0054329

(51) Int. Cl.
*F04B 35/04* (2006.01)
*F04B 53/22* (2006.01)
(Continued)

(52) U.S. Cl.
CPC .............. *F04B 35/04* (2013.01); *F04B 53/22* (2013.01); *F25B 1/02* (2013.01); *H01R 13/506* (2013.01)

(58) Field of Classification Search
CPC . F04B 53/22; F04B 35/04; F25B 1/02; H01R 13/506
See application file for complete search history.

(56) References Cited

U.S. PATENT DOCUMENTS 3,016,511 A * 1/1962 Unger ...................... H01B 7/16 439/935
5,199,898 A * 4/1993 Wisner ................... H01R 24/00 439/367
(Continued)

FOREIGN PATENT DOCUMENTS

CN 112583192 A * 3/2021 ............ F04C 23/008
DE 102019107676 A1 * 10/2019 .............. F04C 23/02
(Continued)

OTHER PUBLICATIONS

Communication dated May 7, 2025, issued by the European Patent Office in counterpart European Application No. 23799546.9.
(Continued)

*Primary Examiner* — Christopher S Bobish
(74) *Attorney, Agent, or Firm* — Sughrue Mion, PLLC

(57) ABSTRACT

A compressor includes a compressor case including a motor and a connection terminal configured to supply power to the motor, and a controller configured to be connected to the compressor case such as to control the power supplied to the motor. The controller includes a cluster configured to be connected to the connection terminal, and a controller case configured to be connected to the compressor case and including a cluster assembly configured to secure the cluster, wherein the cluster may be configured to be connected to the cluster assembly such that the cluster is prevented from being exposed to the outside, and wherein the cluster assembly may include a guide configured to guide the cluster to be inserted horizontally into the cluster assembly and then rotated such that the cluster is secured vertically within the cluster assembly by the cluster assembly.

20 Claims, 13 Drawing Sheets

(51) Int. Cl.
*F25B 1/02* (2006.01)
*H01R 13/506* (2006.01)

(56) References Cited

U.S. PATENT DOCUMENTS

| | | | | |
|---|---|---|---|---|
| 6,372,993 | B1 * | 4/2002 | Eckels | H01R 13/521 439/282 |
| 6,705,892 | B2 * | 3/2004 | Kim | H01R 13/6395 439/378 |
| 6,916,210 | B2 * | 7/2005 | Moore, Jr. | H01R 13/5216 439/651 |
| 9,331,420 | B2 * | 5/2016 | Bedell | H01R 13/52 |
| 9,480,177 | B2 * | 10/2016 | Trudeau, Jr. | H02K 5/225 |
| 10,700,471 | B2 * | 6/2020 | Rech | F04B 35/04 |
| 2017/0207567 | A1 * | 7/2017 | Rech | F04B 39/14 |

FOREIGN PATENT DOCUMENTS

| | | | | | |
|---|---|---|---|---|---|
| JP | H05141357 | A | * | 6/1993 | |
| JP | 2002-373734 | A | | 12/2002 | |
| JP | 2006-161703 | A | | 6/2006 | |
| JP | 2008-102712 | A | | 5/2008 | |
| JP | 2012-112274 | A | | 6/2012 | |
| JP | 2017-125504 | A | | 7/2017 | |
| KR | 10-2003-0063716 | A | | 7/2003 | |
| KR | 10-2004-0041276 | A | | 5/2004 | |
| KR | 10-2005-0033126 | A | | 4/2005 | |
| KR | 20-0382938 | Y1 | | 4/2005 | |
| KR | 10-0597291 | B1 | | 7/2006 | |
| KR | 10-0598955 | B1 | | 7/2006 | |
| KR | 10-2006-0102025 | A | | 9/2006 | |
| KR | 10-0690152 | B1 | | 3/2007 | |
| KR | 10-2007-0058902 | A | | 6/2007 | |
| KR | 10-2009-0114264 | A | | 11/2009 | |
| KR | 10-2015-0134875 | A | | 12/2015 | |
| KR | 10-1994687 | B1 | | 7/2019 | |
| WO | WO-8902663 | A1 | * | 3/1989 | H01R 13/506 |
| WO | WO-2006088116 | A1 | * | 8/2006 | H01R 13/447 |
| WO | WO-2017076465 | A1 | * | 5/2017 | F04B 27/1081 |

OTHER PUBLICATIONS

Communication dated Dec. 6, 2024, issued by the European Patent Office in European Application No. 23799546.9.

International Search Report (PCT/ISA/210) issued on Jun. 20, 2023 by the International Searching Authority in International Patent Application No. PCT/KR2023/003061.

Written Opinion (PCT/ISA/237) issued on Jun. 20, 2023 by the International Searching Authority in International Patent Application No. PCT/KR2023/003061.

* cited by examiner

COMPRESSOR

CROSS-REFERENCE TO RELATED APPLICATIONS

This a bypass continuation application of International Patent Application No. PCT/KR2023/003061, filed on Mar. 7, 2023, which claims priority to Korean Patent Application No. 10-2022-0054329, filed on May 2, 2022, in the Korean Intellectual Property Office, the contents of which are incorporated herein by reference in their entireties.

BACKGROUND

1. Technical Field

Embodiments of the present disclosure relate to a compressor having an improved case structure for a controller controlling a motor.

2. Brief Description of Background Art

In general, a compressor is a mechanical device that compresses air, refrigerant, or various other working gases to increase pressure by receiving power from a power generator, such as an electric motor or turbine, and is widely used in household appliances, such as refrigerators and air conditioners, as well as in various industries.

Compressors may be classified into different types depending on their compression method and sealing structure.

Depending on the compression method, compressors are divided into reciprocating compressors, rotary compressors, and scroll compressors.

Among reciprocating compressors, for example, a sealed reciprocating compressor includes a compression mechanism that compresses refrigerant through reciprocating motion of a piston and an electric mechanism that drives the compression mechanism, wherein the compression mechanism and the electric mechanism are installed in a single sealed case.

A compressor may include a compressor case, a motor which is an electric mechanism provided inside the compressor case, and a controller connected to the compressor case to control the motor.

The controller may include a case forming an exterior, a board controlling the power supplied to the motor of the compressor, a cluster connected to a connection terminal provided in the compressor case, and a wire connecting the board and the connection terminal. Exposing the cluster to the outside of the case may cause problems of allowing insects to enter the cluster.

In addition, the controller may require assembly of the controller case to compressor case after connecting the cluster to the connection terminal, which may complicate the assembly by dividing it into two steps.

SUMMARY

According to embodiments of the present disclosure, a compressor having an improved structure of a controller case is provided such that a cluster is assembled within the controller case.

According to embodiments of the present disclosure, a compressor in which the structure of a controller case is improved is provided so as to facilitate assembly of a cluster.

According to embodiments of the present disclosure, a compressor in which the structure of a controller case and a compressor case is improved is provided so as to facilitate assembly of a controller to the compressor case.

According to embodiments of the present disclosure, a compressor may be provided and include a compressor case including a motor and a connection terminal configured to supply power to the motor, and a controller configured to be connected to the compressor case such as to control the power supplied to the motor. The controller may include a cluster configured to be connected to the connection terminal, and a controller case configured to be connected to the compressor case and including a cluster assembly configured to secure the cluster, wherein the cluster may be configured to be connected to the cluster assembly such that the cluster is prevented from being exposed to the outside, and wherein the cluster assembly may include a guide configured to guide the cluster to be inserted horizontally into the cluster assembly and then rotated such that the cluster is secured vertically within the cluster assembly by the cluster assembly.

According to one or more embodiments of the present disclosure, the plurality of hooks may include: a first hook configured to secure a front portion of a lower surface of the cluster; and a pair of second hooks configured to secure respective sides of a central portion of the lower surface of the cluster.

According to one or more embodiments of the present disclosure, the cluster may include: a wire connector connected to a board inside the controller by at least one wire; at least one connection hole configured to be connected to the at least one connection terminal; and a fixing groove that is configured to receive the first hook in a case where the cluster is inserted horizontally into the cluster assembly and then rotated and secured vertically within the cluster assembly.

According to one or more embodiments of the present disclosure, the at least one wire may be a plurality of wires, the at least one connection hole may be a plurality of connections holes corresponding to a total number of the plurality of wires, and the at least one connection terminal may be a plurality of connection terminals corresponding to the total number of the plurality of wires.

According to one or more embodiments of the present disclosure, the cluster assembly may include a plurality of openings at positions corresponding to the plurality of connection holes, and wherein the plurality of openings may be configured to receive the plurality of connection terminals such that the plurality of connection terminals connect to the plurality of connection holes.

According to one or more embodiments of the present disclosure, the guide may be recessed from an inside of the controller case toward an outside such as to have a U-shape with an open top in a vertical direction of the controller case.

According to one or more embodiments of the present disclosure, the first hook may be at a lower portion of the guide, and the pair of second hooks is above the first hook inside the guide.

According to one or more embodiments of the present disclosure, the cluster may be configured to be inserted into the lower portion of the guide such that a portion of the first hook is received in the fixing groove, and then rotated such that the cluster is received entirely within the guide such that the fixing groove is secured to the first hook and the respective sides of the central portion of the cluster are secured to the pair of second hooks.

According to one or more embodiments of the present disclosure, the at least one wire may be connected to the board inside the controller through the open top of the guide.

According to one or more embodiments of the present disclosure, the compressor case may further include a controller assembly that is connected to the controller, and the controller case may include a compressor assembly that is configured to be connected to the controller assembly.

According to one or more embodiments of the present disclosure, the controller assembly may be formed of a steel material and may be around the at least one connection terminal, and wherein the controller assembly may include: a first fastening hole that is configured to be fastened to the compressor assembly by a fastening member; and an assembling hook that is configured to be inserted into the compressor assembly.

According to one or more embodiments of the present disclosure, the compressor assembly may be around the cluster assembly, and include: a second fastening hole that is configured to be fastened to the first fastening hole by the fastening member; and an assembling hole that is configured to connect to the assembling hook by receiving the assembling hook.

According to one or more embodiments of the present disclosure, the cluster may be configured to, by being connected to the at least one connection terminal, guide a position at which the controller is connected to the compressor case.

According to one or more embodiments of the present disclosure, based on the cluster being connected to the at least one connection terminal, the assembling hook may be inserted into the assembling hole, and positions of the first fastening hole and the second fastening hole are aligned to be fastened together by the fastening member.

According to one or more embodiments of the present disclosure, the compressor assembly may include a square shape that is around the cluster assembly, and the square shape may include a flange including a square-shaped edge protruding toward the compressor case such that the compressor assembly is configured to seal the cluster assembly from the outside in a case where the controller is assembled to the compressor case.

According to e embodiments of the present disclosure, a compressor may be provided and includes a compressor case including a motor and a connection terminal configured to supply power to the motor, and a controller configured to be connected to the compressor case such as to control the power supplied to the motor. The controller may include a cluster configured to be connected to the connection terminal, and a controller case configured to be connected to the compressor case and including sing a cluster assembly configured to secure the cluster, wherein the cluster may be configured to be connected to the cluster assembly such that the cluster is prevented from being exposed to the outside, and wherein the cluster assembly may include a guide configured to guide the cluster to be inserted horizontally into the cluster assembly and then rotated such that the cluster is secured vertically within the cluster assembly by the cluster assembly.

According to one or more embodiments of the present disclosure, a method may of assembling a compressor may be provided and include connecting a cluster of a controller to a cluster assembly of a controller case of the controller such that the cluster is prevented from being exposed to an outside of the controller case, wherein the connecting includes: horizontally inserting the cluster into a guide of the cluster assembly, wherein the guide is configured to guide movement of the cluster; and rotating, after the horizontally inserting and while the cluster is guided by the guide, the cluster into a position such that the cluster is secured vertically within the cluster assembly by a plurality of hooks of the cluster assembly. The method may further include connecting, while the cluster is secured vertically within the cluster assembly, the controller case to a compressor case by connecting the cluster to at least one connection terminal of the compressor case, wherein the compressor case may include a motor, and the at least one connection terminal may be configured to supply power to the motor, and wherein the controller may be configured to control the power supplied to the motor.

According to one or more embodiments of the present disclosure, the plurality of hooks may include: a first hook configured to secure a front portion of a lower surface of the cluster; and a pair of second hooks configured to secure respective sides of a central portion of the lower surface of the cluster.

According to one or more embodiments of the present disclosure, the cluster may include: a wire connector connected to a board inside the controller by at least one wire; at least one connection hole configured to be connected to the at least one connection terminal; and a fixing groove that is configured to receive the first hook in a case where the cluster is inserted horizontally into the cluster assembly and then rotated and secured vertically within the cluster assembly.

According to one or more embodiments of the present disclosure, the guide may be recessed from an inside of the controller case toward an outside such as to have a U-shape with an open top in a vertical direction of the controller case.

According to one or more embodiments of the present disclosure, the cluster may be assembled within the interior of the controller case to prevent insects entering the cluster.

Further, according to one or more embodiments, the structure of the cluster assembly provided inside the controller case may be improved to facilitate assembly of the cluster.

Further, according to one or more embodiments of the present disclosure, when assembling the controller to the compressor case, the cluster may be connected to the connection terminal and the controller case may be assembled to the compressor case at the same time to facilitate assembly.

Further, according to one or more embodiments of the present disclosure, when the controller case is assembled to the compressor case, a space between the controller case and the compressor case may be sealed to prevent insect infiltration and water splashing into the interior.

Further, according to one or more embodiments of the present disclosure, the controller may be assembled securely to the compressor case.

DETAILED DESCRIPTION

Figure 1:
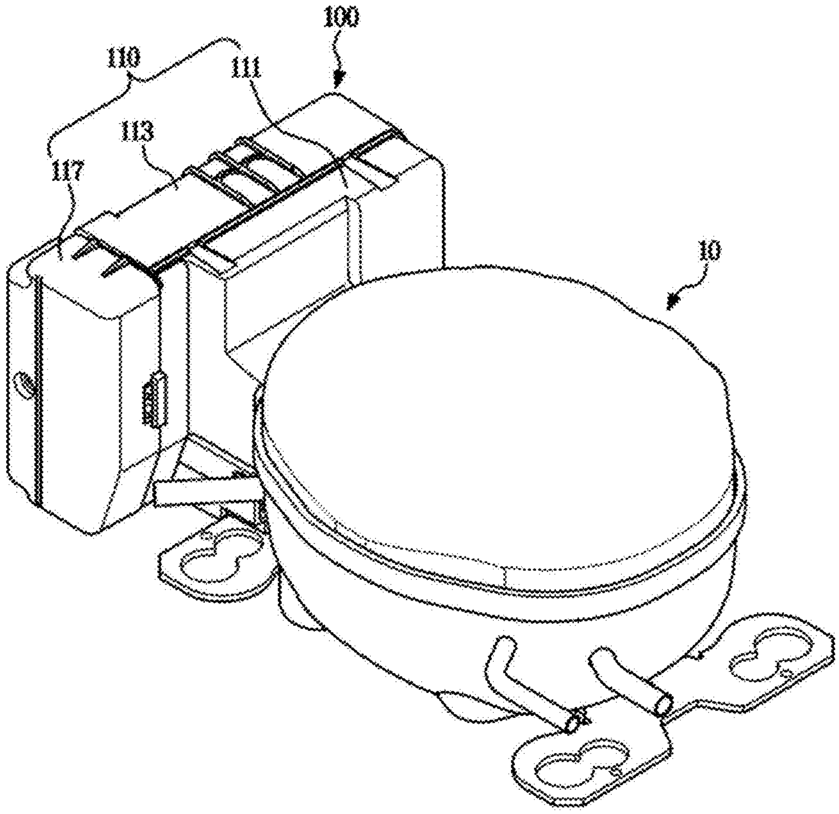
FIG. 1 is a view illustrating a compressor according to an embodiment.

Example embodiments described in the present disclosure and shown in the drawings are merely non-limiting examples of embodiments of the present disclosure and may be modified in various different ways at the time of filing of the present application.

In connection with the description of the drawings, similar reference numerals may be used for similar or related components.

Also, the terms used herein are used to describe example embodiments and are not intended to limit and/or restrict the present disclosure. The singular forms "a," "an" and "the" are intended to include the plural forms as well, unless the context clearly indicates otherwise. In this disclosure, the terms "including," "comprising," "having," and the like are used to specify features, figures, steps, operations, elements, components, or combinations thereof, but do not preclude the presence or addition of one or more of the features, figures, steps, operations, elements, components, or combinations thereof.

It will be understood that, although the terms "first," "second," "primary," "secondary," etc., may be used herein to describe various elements, elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

The terms "front end," "rear end," "upper," "lower", "front," "rear," "top," and "bottom" as used in the following description may be defined with reference to the drawings, and the shape and position of each component is not limited by these terms.

Non-limiting example embodiments of the present disclosure will be described in detail below with reference to the accompanying drawings.

Figure 2:
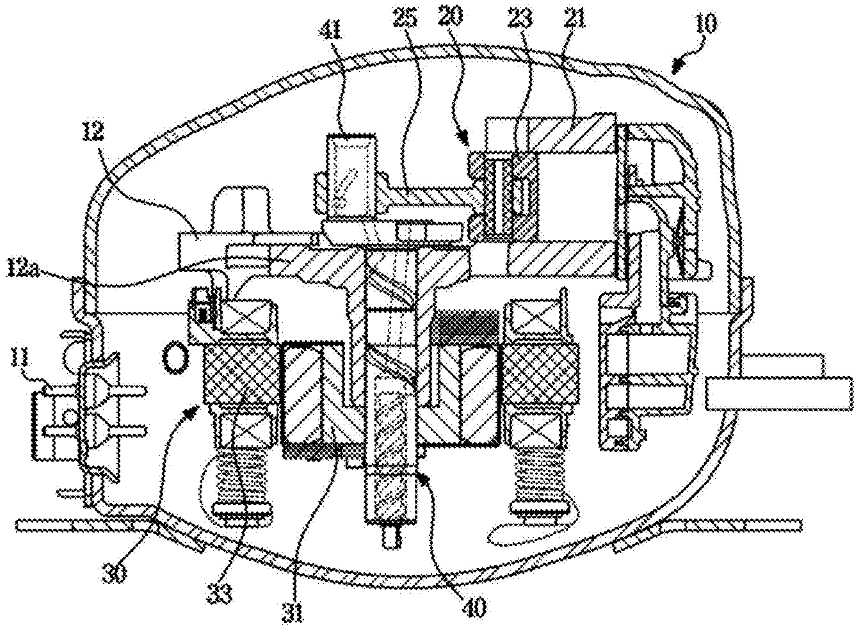
FIG. 2 is a cross-sectional view schematically illustrating the compressor with a controller disconnected, according to an embodiment.
Figure 3:
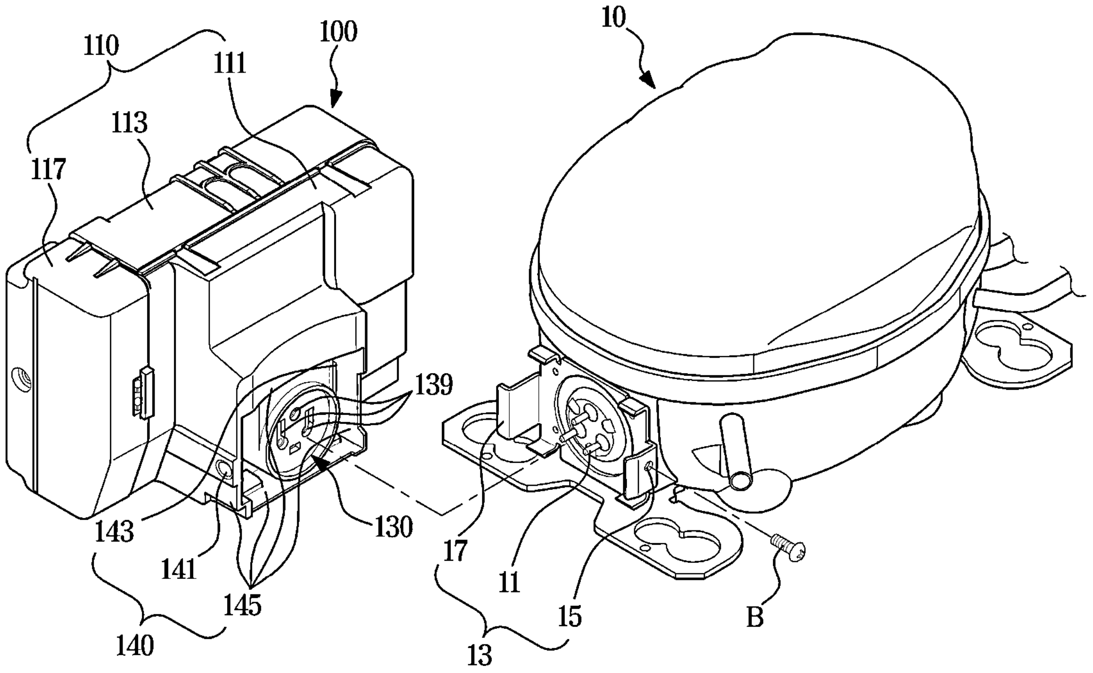
FIG. 3 is a view illustrating a compressor case and the controller separated, according to an embodiment.

FIG. 1 is a view illustrating a compressor according to an embodiment. FIG. 2 is a cross-sectional view schematically illustrating the compressor with a controller disconnected, according to an embodiment. FIG. 3 is a view illustrating a compressor case and the controller separated, according to an embodiment.

As shown in FIGS. 1 to 3, the compressor may include a compression mechanism 20 that compresses a refrigerant through reciprocating motion of a piston 23, and a compressor case 10 in which a motor 30, which is an electric mechanism that drives the compression mechanism 20, is provided. The compressor case 10 may be a sealed case.

The compressor may include a frame 12 for securing various components within the compressor case 10, the compression mechanism 20 installed on an upper side of the frame 12, the motor 30 which is the electric mechanism installed (e.g., mounted) on a lower side of the frame 12 for driving the compression mechanism 20, and a rotating shaft 40 disposed in a vertical direction to transmit a driving force of the motor 30 to the compression mechanism 20 and rotatably supported on an axial support **12*a* of the frame 12**.

The compression mechanism 20 may include a cylinder 21 that forms a compression space for the refrigerant and is secured to the frame 12, the piston 23 that advances and retreats inside the cylinder 21 and compresses the refrigerant, and a connecting rod 25 that connects an eccentric portion 41 and the piston 23.

The motor 30 may be a brushless direct current (BLDC) motor. In other words, the motor 30 may be a DC motor using direct current (DC) voltage, but without brushes.

The motor 30 may include a stator 33 fixed to the frame 12, and a rotor 31 rotating on an inner side of the stator 33. The rotor 31 may include a hollow space in which the rotating shaft 40 may be received. The rotating shaft 40 may be press-fitted into the hollow space of the rotor 31 and may rotate together with the rotor 31.

The rotating shaft 40 may include the eccentric portion 41 that is eccentric to the central axis of rotation of, for example, the rotating shaft 40. The eccentric portion 41 may be connected to the piston 23 by the connecting rod 25 to allow a rotational movement of the rotating shaft 40 to be converted into a linear translational movement of the piston 23.

The compressor case 10 may include a connection terminal 11 for supplying power to the motor 30. The connection terminal 11 may be provided in plural. A cluster 120 (see FIG. 4) of a controller 100, which will be described below, may be connected to the plurality of the connection terminals 11 to control the power supplied to the motor 30 through the controller 100.

The compressor case 10 may include a controller assembly 13 in which the controller 100 is assembled (e.g., connected). The controller assembly 13 may be formed around the plurality of connection terminals 11. The controller assembly 13 may be formed of a steel material.

The controller assembly 13 may include a first fastening hole 15 to which the controller 100 is fastened by a fastening member B. The controller assembly 13 may include an assembling hook 17 that is inserted into and assembled with the controller 100. The first fastening hole 15 and the assembling hook 17 will be described in more detail below.

The compressor may include the controller 100 that is fastened to the compressor case 10 and is configured to control power supplied to the motor 30 arranged within the compressor case 10.

The controller 100 may include a controller case 110 forming an exterior of the controller 100. The controller case 110 may include a first case 111, a second case 113, and a side case 117.

The first case 111 is a portion that is assembled to the compressor case 10 and may include a cluster assembly 130 to which the cluster 120 is assembled. The cluster assembly 130 will be described in more detail below.

The first case 111 may include a compressor assembly 140 that is assembled (e.g., connected) to the compressor case 10. The compressor assembly 140 may be assembled to the controller assembly 13 formed in the compressor case 10. The compressor assembly 140 may be formed to have a square shape around the cluster assembly 130 of the first case 111.

The compressor assembly 140 may include a second fastening hole 141 that is fastened to the first fastening hole 15 of the controller assembly 13 by the fastening member B. The compressor assembly 140 may include an assembling hole 143 into which the assembling hook 17 of the controller assembly 13 is inserted and assembled. The second fastening hole 141 and the assembling hole 143 will be described in more detail below.

The compressor assembly 140 may include a flange 145 having a square-shaped edge protruding toward the compressor case 10. The flange 145 may be formed to have a square shape that surrounds the cluster assembly 130. The flange 145 may be in close contact with the compressor case 10 to ensure that the cluster assembly 130 is sealed from the outside when the controller 100 is assembled to the compressor case 10. Because the cluster assembly 130 is sealed from the outside by the flange 145, it is possible to prevent insects and the like from entering the cluster 120 (see FIG. 4) through the cluster assembly 130.

In addition, based on the cluster assembly 130 being sealed from the outside by the flange 145, water splashing into the cluster 120 (see FIG. 4) through the cluster assembly 130 may be prevented. In other words, in the event that the compressor is used in a refrigerator, the compressor is placed in a machine room positioned at a lower portion of the refrigerator, water may fall to the floor and splash onto the cluster assembly 130. The flange 145 may seal the cluster assembly 130 from the outside, thereby preventing water from splashing and entering the cluster 120 (see FIG. 4).

Figure 4:
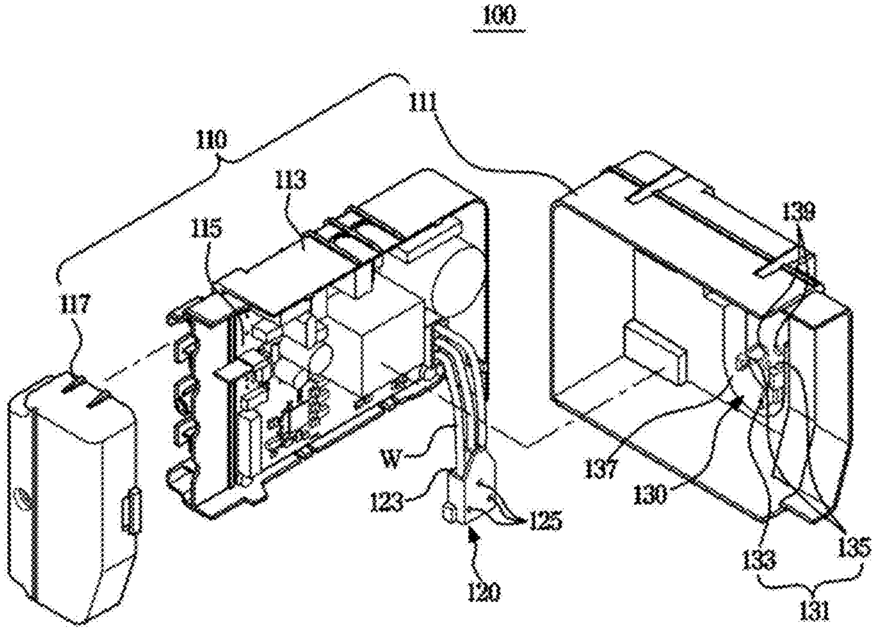
FIG. 4 is a view illustrating a controller case of the controller separated from the controller according to an embodiment.
Figure 5:
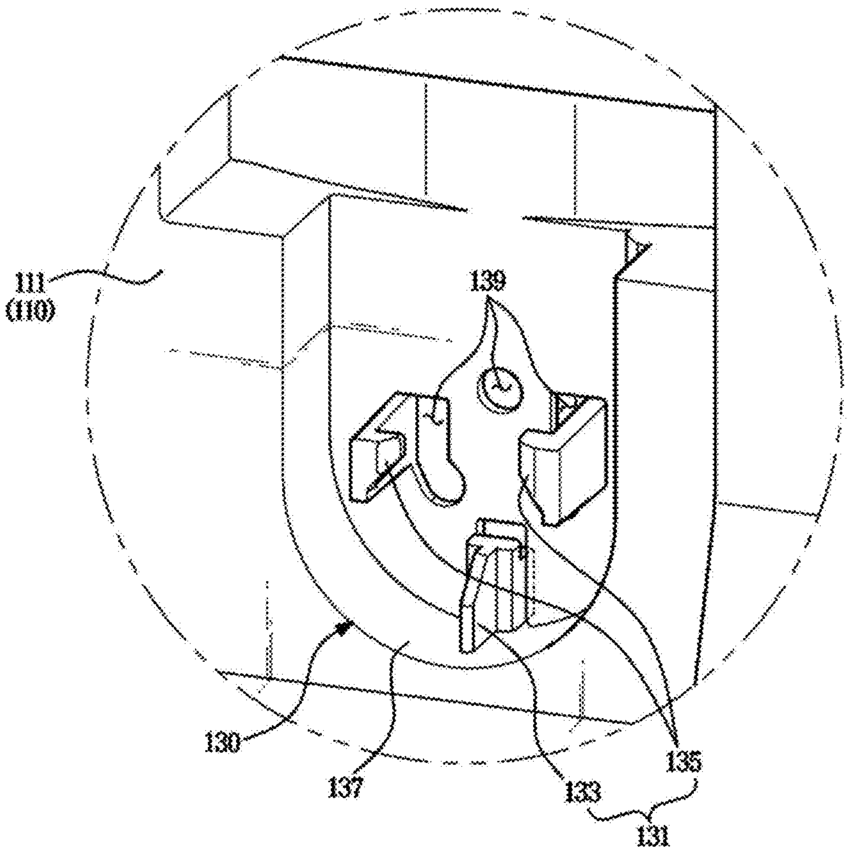
FIG. 5 is an enlarged view illustrating a cluster assembly according to an embodiment.

FIG. 4 is a view showing the controller case of the controller being separated from the controller according to an embodiment. FIG. 5 is an enlarged view showing the cluster assembly according to an embodiment.

As shown in FIGS. 4 and 5, the controller 100 may include the cluster 120 connected to the plurality of the connection terminals 11 (see FIG. 3) formed on the compressor case 10. The cluster 120 may connect the controller 100 and the compressor case 10 (see FIG. 3) to control the power supplied to the motor 30 (see FIG. 2) arranged inside the compressor case 10 (see FIG. 3).

The cluster 120 may include a wire connector 123 connected to a board 115, assembled in the second case 113, by a wire W. The wire connector 123 may be provided on a rear side of the cluster 120. The wire W connecting the board 115 and the cluster 120 may be provided in plural. Three wires W are shown in the drawings, but embodiments of the present disclosure are not limited thereto. The wire connectors 123 may be provided in a number corresponding to the number of wires W.

The cluster 120 may include connection holes 125 connected to the connection terminals 11 of the compressor case 10 (see FIG. 3). The connection holes 125 may be provided in plural. In response to the plurality of connection holes 125 being provided, the plurality of connection terminals 11 (see FIG. 3) to which the connection holes 125 are connected may also be provided. In other words, the connection holes 125 and the connection terminals 11 (see FIG. 3) may be provided to have a corresponding number of wires W. In the drawings, three connection holes 125 and three connection terminals 11 (see FIG. 3) are shown, but embodiments of the present disclosure are not limited thereto.

The cluster 120 may include a fixing groove 127 (see FIG. 6) secured to a first hook 133 of the cluster assembly 130. The fixing groove 127 may be provided on a lower surface of the cluster 120. The fixing groove 127 may be provided in a front portion of the lower surface of the cluster 120. The configuration in which the first hook 133 is fixed to the fixing groove 127 will be described in more detail below.

The controller 100 may include the cluster assembly 130 in which the cluster 120 is assembled. The cluster assembly 130 may be formed in the first case 111. The cluster assembly 130 may be formed on an interior of the first case 111. The cluster assembly 130 may be formed on the interior of the controller case 110 to prevent the cluster 120 from being exposed to the outside. By preventing the cluster 120 from being exposed to the outside, insects and the like may be prevented from infiltrating the cluster 120.

The cluster assembly 130 may include a plurality of hooks 131 for securing the cluster 120. Although the plurality of hooks 131 is shown in the drawings as including three hooks, embodiments of the present disclosure are not limited thereto.

The plurality of hooks 131 may include the first hook 133 that secures the front portion of a lower surface 121 (see FIG. 6) of the cluster 120. When the cluster 120 is assembled to the cluster assembly 130, the first hook 133 may engage with the fixing groove 127 formed on the front portion of the lower surface 121 of the cluster 120 to secure the cluster 120.

The plurality of hooks 131 may include a pair of second hooks 135 that secure both side surfaces of a central portion of the lower surface 121 (see FIG. 6) of the cluster 120. When the cluster 120 is assembled to the cluster assembly 130, the pair of second hooks 135 may be engaged with the lower surface 121 of the cluster 120 to secure the cluster 120.

Because the cluster 120 is assembled by engaging the plurality of hooks 131 formed in the cluster assembly 130, the cluster 120 may be easily assembled to the cluster assembly 130.

The cluster assembly 130 may include a guide 137 provided to guide the assembly of the cluster 120. The guide 137 may be formed to have a U-shape with an open top. The open top may face in a direction that is opposite to a facing direction of the lower surface of the controller case 110. The guide 137 may be formed to be recessed from an inside of the first case 111 toward the outside. The plurality of hooks 131 may be provided inside the guide 137. The first hook 133 of the plurality of hooks 131 may be positioned at a lower portion of the guide 137. A pair of second hooks 135 of the plurality of hooks 131 may be positioned above the first hook 133 inside the guide 137.

The wire W connected to the cluster 120 may be connected to the board 115 within the controller 100 through the open top of the guide 137.

The cluster assembly 130 may include a plurality of openings 139 formed at positions corresponding to the plurality of connection holes 125 formed in the cluster 120. The plurality of connection terminals 11 (see FIG. 3) may be connected to a plurality of connection holes 125 through the plurality of openings 139.

Although three connection holes 125 and three openings 139 are shown in the drawings, embodiments of the present disclosure are not limited thereto.

Next, with reference to FIGS. 6 to 11, the operation of assembling the cluster 120 into the cluster assembly 130 will be described in more detail.

Figure 6:
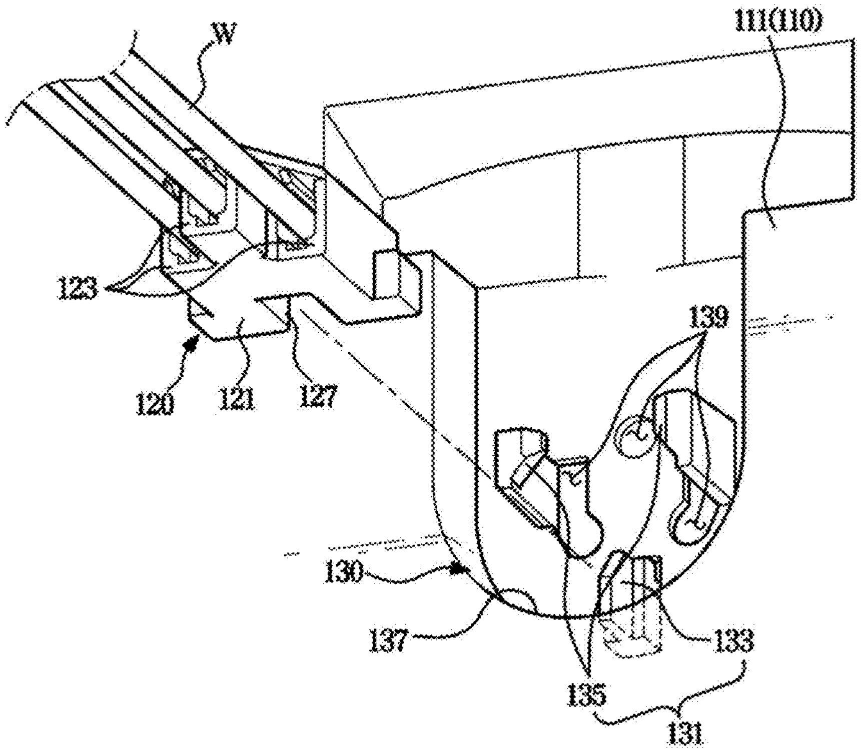
FIG. 6 is a view of a cluster being inserted horizontally into the cluster assembly, according to an embodiment.
Figure 7:
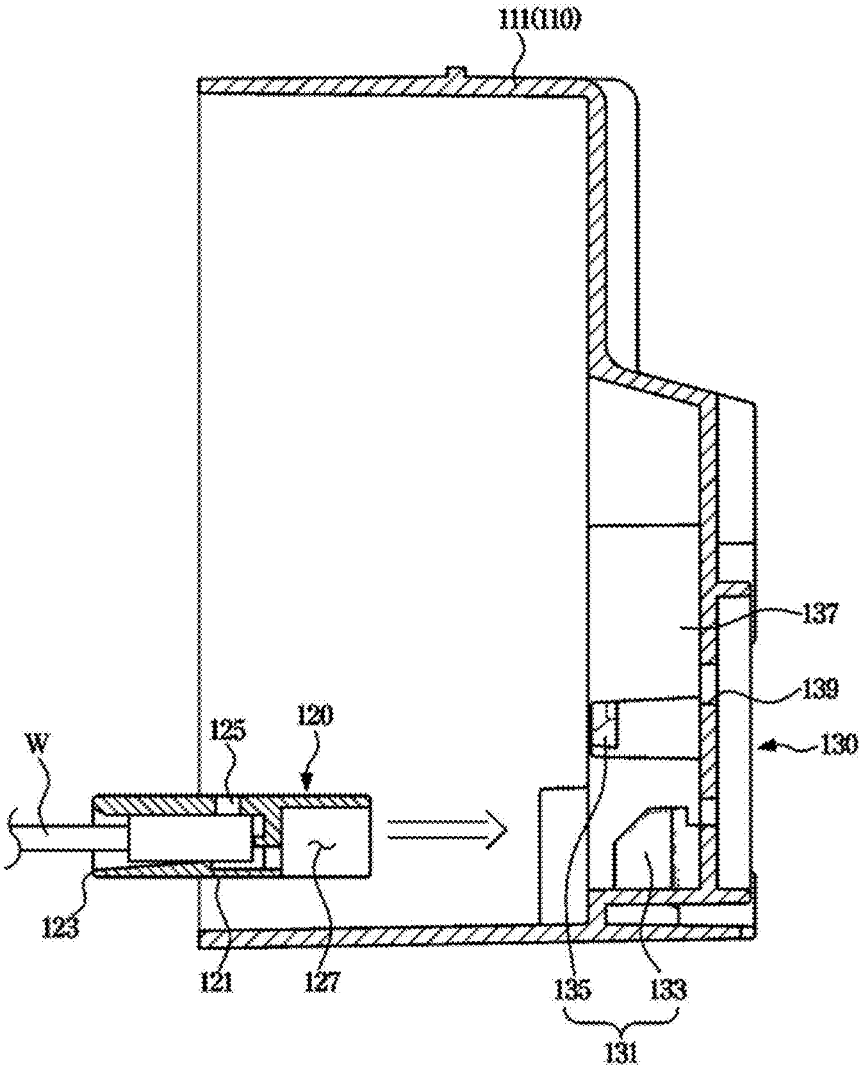
FIG. 7 is a cross-sectional view illustrating the cluster being inserted horizontally into the cluster assembly, according to an embodiment.
Figure 8:
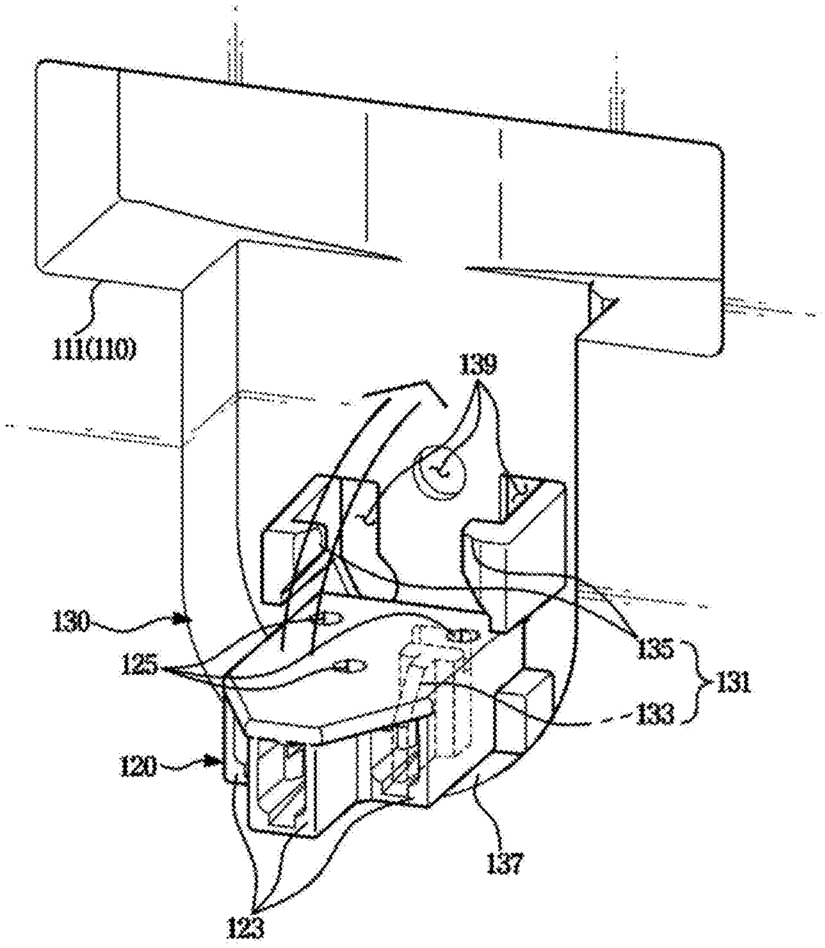
FIG. 8 is a view illustrating the cluster according to an embodiment being inserted horizontally into the cluster assembly and then guided by a guide to be rotated vertically.
Figure 9:
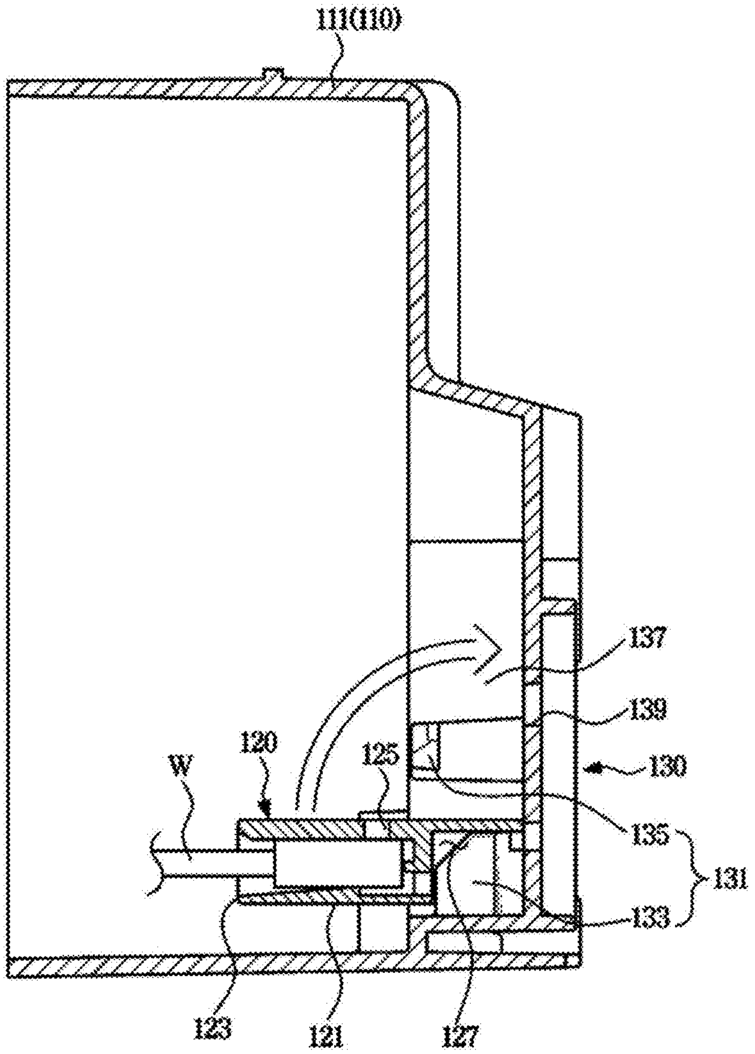
FIG. 9 is a cross-sectional view illustrating the cluster, according to an embodiment, being inserted horizontally into the cluster assembly and then guided by the guide to be rotated vertically.
Figure 10:
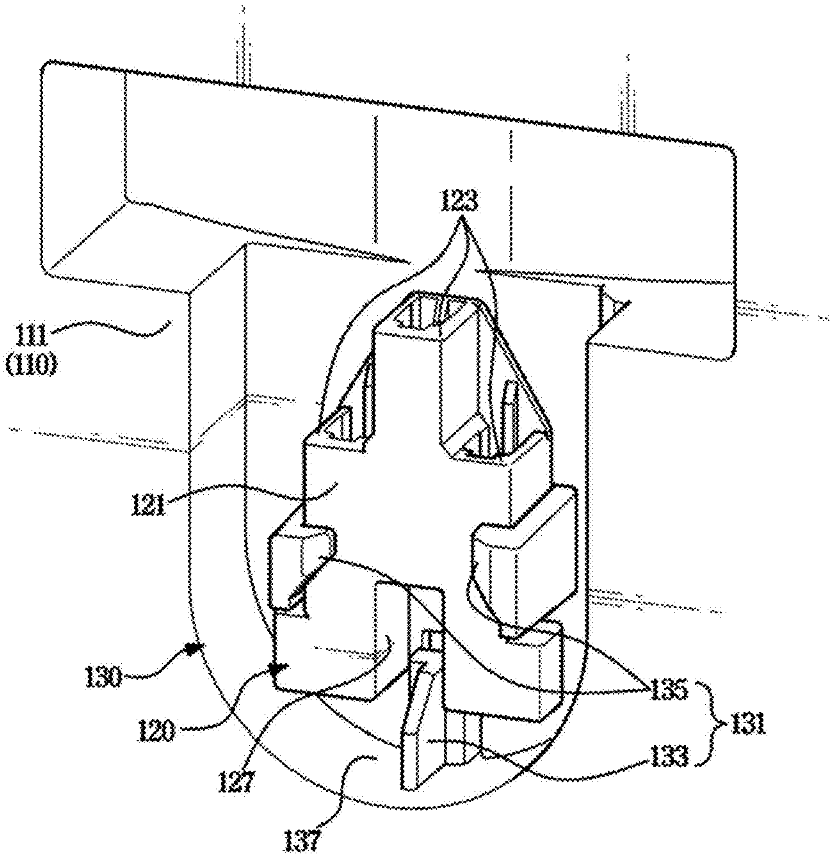
FIG. 10 is a view illustrating the cluster according to an embodiment being guided by the guide, rotated vertically, and secured to a plurality of hooks.
Figure 11:
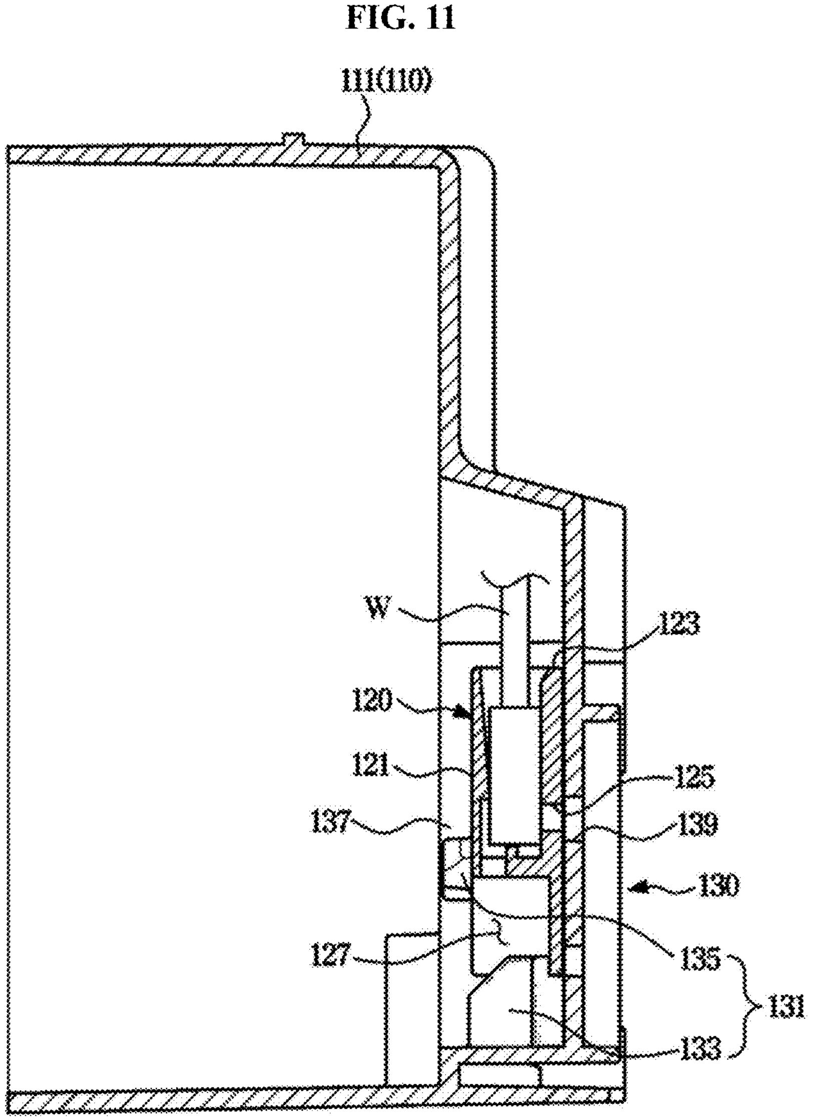
FIG. 11 is a cross-sectional view illustrating the cluster, according to an embodiment, being guided by the guide, rotated vertically, and secured to the plurality of hooks.

FIG. 6 is a view of a cluster being inserted horizontally into the cluster assembly, according to an embodiment. FIG. 7 is a cross-sectional view illustrating the cluster being inserted horizontally into the cluster assembly, according to an embodiment. FIG. 8 is a view illustrating the cluster according to an embodiment being inserted horizontally into the cluster assembly and then guided by a guide to be rotated vertically. FIG. 9 is a cross-sectional view illustrating the cluster, according to an embodiment, being inserted horizontally into the cluster assembly and then guided by the guide to be rotated vertically. FIG. 10 is a view illustrating the cluster according to an embodiment being guided by the guide, rotated vertically, and secured to a plurality of hooks. FIG. 11 is a cross-sectional view illustrating the cluster, according to an embodiment, being guided by the guide, rotated vertically, and secured to the plurality of hooks.

As shown in FIGS. 6 and 7, the cluster 120 may be horizontally inserted into the cluster assembly 130 in a direction that crosses (e.g., is perpendicular to) the facing direction of the lower surface of the controller case 110. The cluster 120 may be horizontally inserted into the lower portion of the guide 137. In this case, the cluster 120 may be inserted into the cluster assembly 130 such that a portion of the first hook 133 is received in the fixing groove 127 formed in the front portion of the lower surface 121 of the cluster 120.

As shown in FIGS. 8 and 9, when the cluster 120 is horizontally inserted into the cluster assembly 130, a portion of the first hook 133 may be received in the fixing groove 127. When the front surface of the cluster 120 contacts the recessed surface of the guide 137 by inserting the cluster 120 so that the portion of the first hook 133 is received in the fixing groove 127, the cluster 120 may be rotated vertically. In other words, the cluster 120 may be rotated vertically so that the front side of the cluster 120, in which the fixing groove 127 is formed, is located at the lower portion of the guide 137, and the rear side of the cluster 120, in which the wire connector 123 is formed, is located at the upper portion of the guide 137.

As shown in FIGS. 10 and 11, as the cluster 120 is rotated vertically, the fixing groove 127 may be inserted into the first hook 133, and the front portion of the lower surface 121 of the cluster 120 may be secured to the first hook 133. In FIGS. 10-11, a front side of the cluster 120 may become a lower side of the cluster 120 as the cluster 120 is rotated.

In response to the cluster 120 being rotated by 90 degrees, the cluster 120 may contact the recessed surface of the guide 137. In other words, when the cluster 120 is rotated by 90 degrees, the upper surface of the cluster 120 in which the connection hole 125 is formed may contact the recessed surface of the guide 137. At this time, the cluster 120 may be secured by inserting the front portion of the lower surface 121 into the first hook 133. In addition, the cluster 120 may be secured by engaging each side of the central portion of the lower surface 121 into each of the pair of second hooks 135. When the cluster 120 is secured by the plurality of hooks 131, the cluster 120 may be received entirely within the guide 137.

In other words, when the cluster 120 is rotated vertically after the cluster 120 is inserted horizontally so that the front surface of the cluster 120 contacts the recessed surface of the guide 137, the cluster 120 may be assembled to the cluster assembly 130 by being secured to the plurality of hooks 131. As described above, the cluster 120 may be assembled to the cluster assembly 130 through a simple operation.

Once the cluster 120 is assembled to the cluster assembly 130, the plurality of connection holes 125 formed in the cluster 120 may be in a state where they may be connected to the plurality of connection terminals 11 formed in the compressor case 10 through the plurality of openings 139 formed in the cluster assembly 130.

Next, with reference to FIGS. 12 and 13, the operation of assembling the controller 100 to the compressor case 10 will be described in more detail.

Figure 12:
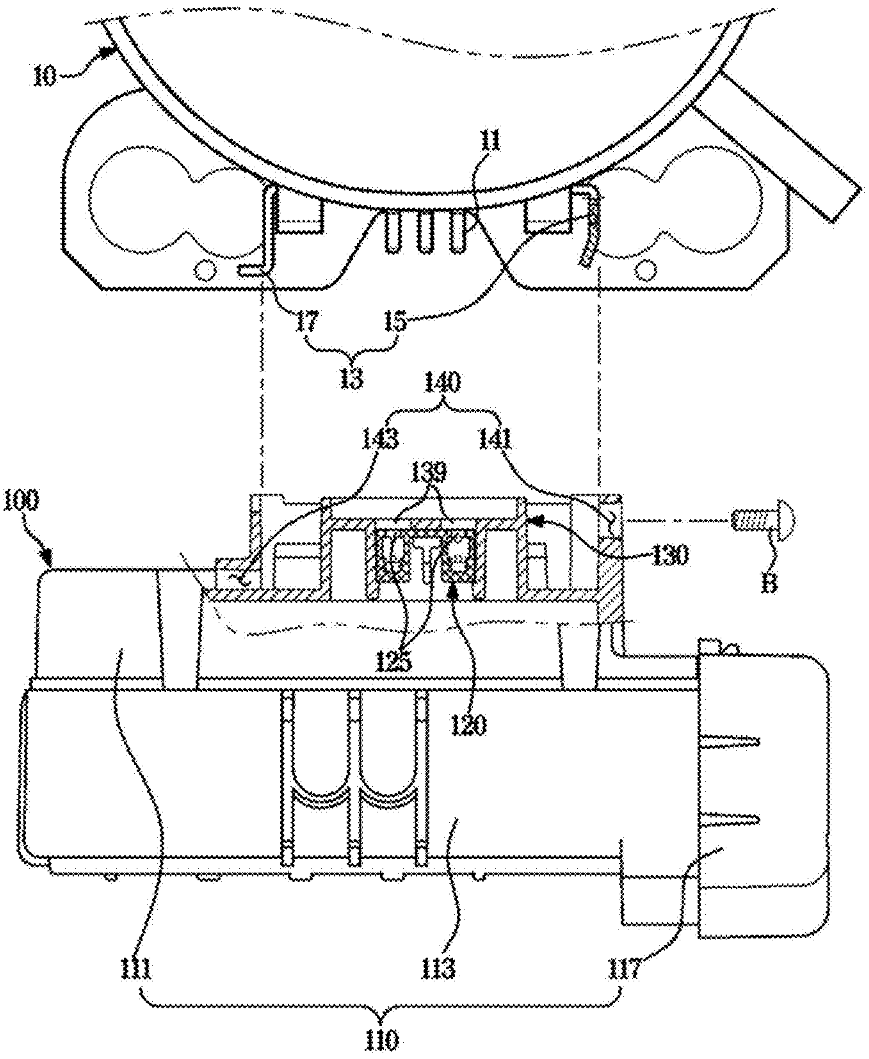
FIG. 12 is a view of the controller, according to an embodiment, being assembled to the compressor case.

FIG. 12 is a view showing the controller according to an embodiment being assembled to the compressor case. FIG. 13 is a view showing the controller according to an embodiment being assembled in the compressor case.

As shown in FIG. 12, with the cluster 120 assembled to the cluster assembly 130, the controller 100 may be moved toward the compressor case 10 such that the plurality of connection terminals 11 of the compressor case 10 is inserted into the plurality of connection holes 125 of the cluster 120.

Figure 13:
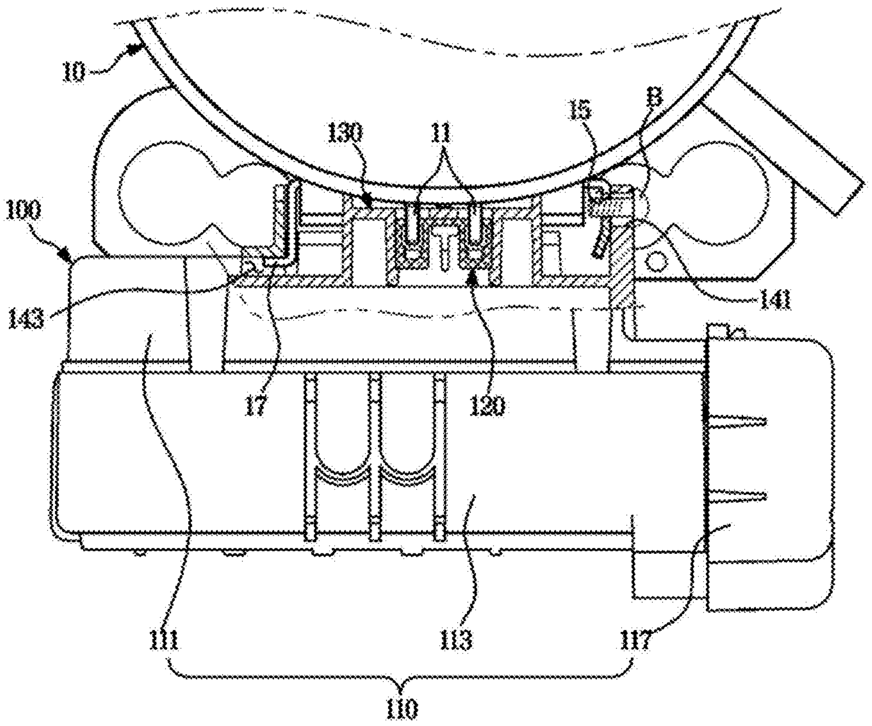
FIG. 13 is a view illustrating the controller according to an embodiment assembled in the compressor case.

As shown in FIG. 13, once the plurality of connection terminals 11 of the compressor case 10 is inserted into the plurality of connection holes 125 of the cluster 120, a position at which the controller 100 is assembled to the compressor case 10 may be guided. In other words, based on the plurality of connection holes 125 of the cluster 120 and the plurality of connection terminals 11 of the compressor case 10 being connected, the position at which the controller 100 is assembled to the compressor case 10 may be guided.

As a result, when the plurality of connection holes 125 of the cluster 120 and the plurality of connection terminals 11 of the compressor case 10 are connected, the controller assembly 13 formed in the compressor case 10 may be in a position to be assembled to the compressor assembly 140 formed in the controller case 110 without the need to adjust the position of the controller 100.

In other words, the first fastening hole 15 of the controller assembly 13 may be located at a position corresponding to the second fastening hole 141 of the compressor assembly 140. In addition, the assembling hook 17 of the controller assembly 13 may be inserted into and secured to the assembling hole 143 of the compressor assembly 140. As described above, based on the assembling hook 17 of the controller assembly 13 being inserted into the assembling hole 143 of the compressor assembly 140 and the positions of the first fastening hole 15 of the controller assembly 13 and the second fastening hole 141 of the compressor assembly 140 being aligned, the first fastening hole 15 and the second fastening hole 141 may be fastened by the fastening member B.

As described above, in response to the cluster 120 being connected to the plurality of connection terminals 11 of the compressor case 10, the controller 100 may be guided to a position where it may be assembled to the compressor case 10 without separate position adjustment, thereby facilitating assembly of the controller 100 to the compressor case 10.

When the controller 100 is assembled to the compressor case 10, the flange 145 (see FIG. 3) of the controller 100 may be in close contact with the compressor case 10, so that the cluster assembly 130 may be sealed from the outside. When the cluster assembly 130 is sealed from the outside by the flange 145, insects and the like may be prevented from entering the cluster 120 through the cluster assembly 130 (see FIG. 2).

Furthermore, since the assembling hook 17 is a part of the controller assembly 13 formed of the steel material, the assembling hole 143, to which the assembling hook 17 is assembled, is in the compressor assembly 140 of the controller 100 that is assembled to the controller assembly 13, the controller 100 may be firmly assembled to the compressor case 10.

Although certain example embodiments are described above and shown in the drawings, embodiments of the present disclosure are not limited to the certain example embodiments. Various applications and modifications may be performed by those skilled in the art without deviating from the scope of the present disclosure, and such applications and modifications should be understood as within the scope of the present disclosure.

What is claimed is:

1. A compressor, comprising:

a compressor case comprising a brushless direct current (BLDC) motor and at least one connection terminal configured to supply power to the BLDC motor; and a controller configured to be connected to the compressor case such as to control the power supplied to the BLDC motor, wherein the controller comprises:

a cluster configured to be connected to the at least one connection terminal; and a controller case configured to be connected to the compressor case and comprising a cluster assembly, wherein the cluster is configured to be connected to the cluster assembly such that the cluster is prevented from being exposed to an outside of the controller case, wherein the cluster assembly comprises:

a plurality of hooks configured to secure the cluster, the plurality of hooks comprising a first hook configured to secure a front portion of a lower surface of the cluster; and a guide configured to guide the cluster to be inserted horizontally into the cluster assembly and then rotated such that the cluster is secured vertically within the cluster assembly by the plurality of hooks, wherein the cluster comprises a fixing groove that is configured to receive the first hook in a case where the cluster is inserted horizontally into the cluster assembly and then rotated and secured vertically within the cluster assembly.

2. The compressor of claim 1, wherein the plurality of hooks further comprises:

a pair of second hooks configured to secure respective sides of a central portion of the lower surface of the cluster.

3. The compressor of claim 2, wherein the cluster further comprises:

a wire connector connected to a board inside the controller by at least one wire; and at least one connection hole configured to be connected to the at least one connection terminal.

4. The compressor of claim 3, wherein the at least one wire is a plurality of wires, the at least one connection hole is a plurality of connections holes corresponding to a total number of the plurality of wires, and the at least one connection terminal is a plurality of connection terminals corresponding to the total number of the plurality of wires.

5. The compressor of claim 4, wherein the cluster assembly comprises a plurality of openings at positions corresponding to the plurality of connection holes, and wherein the plurality of openings are configured to receive the plurality of connection terminals such that the plurality of connection terminals connect to the plurality of connection holes.

6. The compressor of claim 3, wherein the guide is recessed from an inside of the controller case toward an outside such as to have a U-shape with an open top in a vertical direction of the controller case.

7. The compressor of claim 6, wherein the first hook is at a lower portion of the guide, and the pair of second hooks is above the first hook inside the guide.

8. The compressor of claim 7, wherein the cluster is configured to be inserted into the lower portion of the guide such that a portion of the first hook is received in the fixing groove, and then rotated such that the cluster is received entirely within the guide such that the fixing groove is secured to the first hook and the respective sides of the central portion of the cluster are secured to the pair of second hooks.

9. The compressor of claim 6, wherein the at least one wire is connected to the board inside the controller through the open top of the guide.

10. The compressor of claim 1, wherein the compressor case further comprises a controller assembly that is configured to be connected to the controller, and the controller case comprises a compressor assembly that is configured to be connected to the controller assembly.

11. The compressor of claim 10, wherein the controller assembly is formed of a steel material and is around the at least one connection terminal, and wherein the controller assembly comprises:

a first fastening hole that is configured to be fastened to the compressor assembly by a fastening member; and an assembling hook that is configured to be inserted into the compressor assembly.

12. The compressor of claim 11, wherein the compressor assembly is around the cluster assembly, and comprises:

a second fastening hole that is configured to be fastened to the first fastening hole by the fastening member; and an assembling hole that is configured to connect to the assembling hook by receiving the assembling hook.

13. The compressor of claim 12, wherein the cluster is configured to, by being connected to the at least one connection terminal, guide a position at which the controller is connected to the compressor case.

14. The compressor of claim 13, wherein based on the cluster being connected to the at least one connection terminal, the assembling hook is inserted into the assembling hole, and positions of the first fastening hole and the second fastening hole are aligned to be fastened together by the fastening member.

15. The compressor of claim 10, wherein the compressor assembly comprises a square shape that is around the cluster assembly, and the square shape comprises a flange comprising a square-shaped edge protruding toward the compressor case such that the compressor assembly is configured to seal the cluster assembly from the outside in a case where the controller is assembled to the compressor case.

16. A compressor, comprising:

a compressor case comprising a motor and a connection terminal configured to supply power to the motor; and a controller configured to be connected to the compressor case such as to control the power supplied to the motor, wherein the controller comprises:

a cluster configured to be connected to the connection terminal; and a controller case configured to be connected to the compressor case and comprising a cluster assembly configured to secure the cluster, wherein the cluster is configured to be connected to the cluster assembly such that the cluster is prevented from being exposed to the outside, wherein the cluster assembly comprises: a guide configured to guide the cluster to be inserted horizontally into the cluster assembly and then rotated such that the cluster is secured vertically within the cluster assembly by the cluster assembly, wherein the compressor case further comprises a controller assembly that is configured to be connected to the controller, wherein the controller case comprises a compressor assembly that is configured to be connected to the controller assembly, and wherein the controller assembly comprises:

a first fastening hole that is configured to be fastened to the compressor assembly by a fastening member; and an assembling hook that is configured to be inserted into the compressor assembly.

17. A compressor, comprising:

a compressor case comprising a brushless direct current (BLDC) motor and at least one connection terminal configured to supply power to the BLDC motor; and a controller configured to be connected to the compressor case such as to control the power supplied to the BLDC motor, wherein the controller comprises:

a cluster configured to be connected to the at least one connection terminal; and a controller case configured to be connected to the compressor case and comprising a cluster assembly, wherein the cluster is configured to be connected to the cluster assembly such that the cluster is prevented from being exposed to an outside of the controller case, and wherein the cluster assembly comprises:

a plurality of hooks configured to secure the cluster, a guide configured to guide the cluster to be inserted horizontally into the cluster assembly and then rotated such that the cluster is secured vertically within the cluster assembly by the plurality of hooks, wherein the compressor case further comprises a controller assembly that is configured to be connected to the controller, wherein the controller case comprises a compressor assembly that is configured to be connected to the controller assembly, and wherein the controller assembly comprises:

a first fastening hole that is configured to be fastened to the compressor assembly by a fastening member; and an assembling hook that is configured to be inserted into the compressor assembly.

18. The compressor of claim 17, wherein the compressor assembly is around the cluster assembly, and comprises:

a second fastening hole that is configured to be fastened to the first fastening hole by the fastening member; and an assembling hole that is configured to connect to the assembling hook by receiving the assembling hook.

19. The compressor of claim 18, wherein the cluster is configured to, by being connected to the at least one connection terminal, guide a position at which the controller is connected to the compressor case.

20. The compressor of claim 19, wherein based on the cluster being connected to the at least one connection terminal, the assembling hook is inserted into the assembling hole, and positions of the first fastening hole and the second fastening hole are aligned to be fastened together by the fastening member.

* * * * *